United States Patent [19]

Emmadi

[11] 4,265,346
[45] May 5, 1981

[54] CONTROL VALVE MECHANISM FOR HYDRAULIC CLUTCH IN A POWER TRANSMISSION MECHANISM

[75] Inventor: Ramakrishna Emmadi, Troy, Mich.

[73] Assignee: Ford Motor Company, Dearborn, Mich.

[21] Appl. No.: 960

[22] Filed: Jan. 4, 1979

[51] Int. Cl.$^3$ ............................................. B60K 41/02
[52] U.S. Cl. ............................ 192/0.034; 192/0.076; 192/0.096; 192/109 F; 137/505.13; 74/867
[58] Field of Search ............... 192/0.034, 0.076, 0.096, 192/109 F, 0.075; 74/864, 869, 867; 137/505.13, 505.14

[56] References Cited

U.S. PATENT DOCUMENTS

| | | | |
|---|---|---|---|
| 3,572,479 | 3/1971 | Kelley | 192/109 F |
| 3,722,646 | 3/1973 | Oguma | 192/109 F |
| 3,935,793 | 2/1976 | Murakami | 192/109 F |
| 4,033,201 | 7/1977 | Sakai | 192/109 F |
| 4,086,994 | 5/1978 | Hirosawa et al. | 192/109 F |

Primary Examiner—George H. Krizmanich
Attorney, Agent, or Firm—Donald J. Harrington; Keith L. Zerschling

[57] ABSTRACT

A control valve system for controlling the capacity of a hydraulic clutch in a power transmission mechanism wherein the clutch torque established by the hydraulic clutch will be nearly equal to the engine torque for the engine with which the transmission is used, thereby resulting in a smooth clutch engagement as a torque transmitting path is established from the engine to a driven member.

2 Claims, 3 Drawing Figures

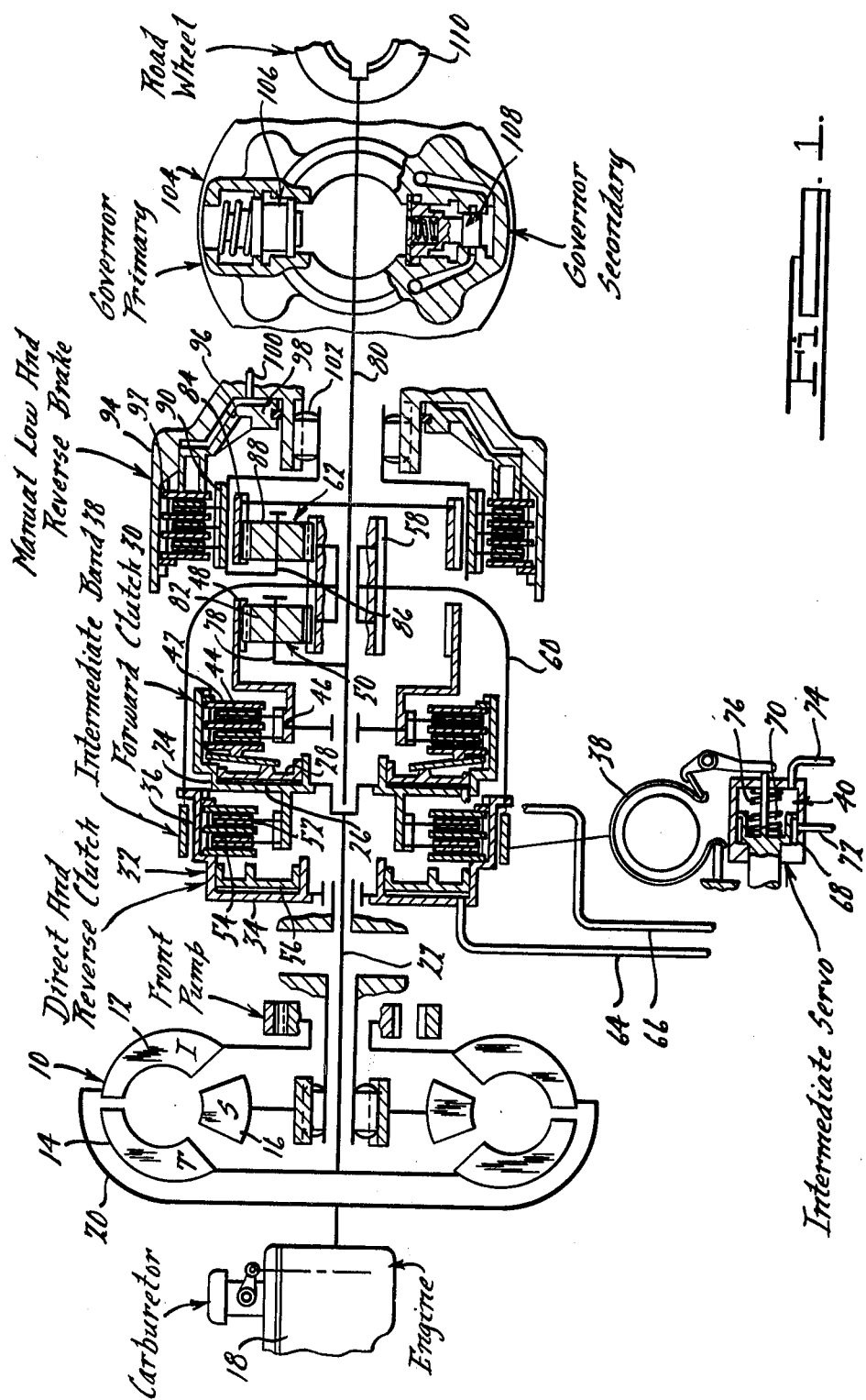

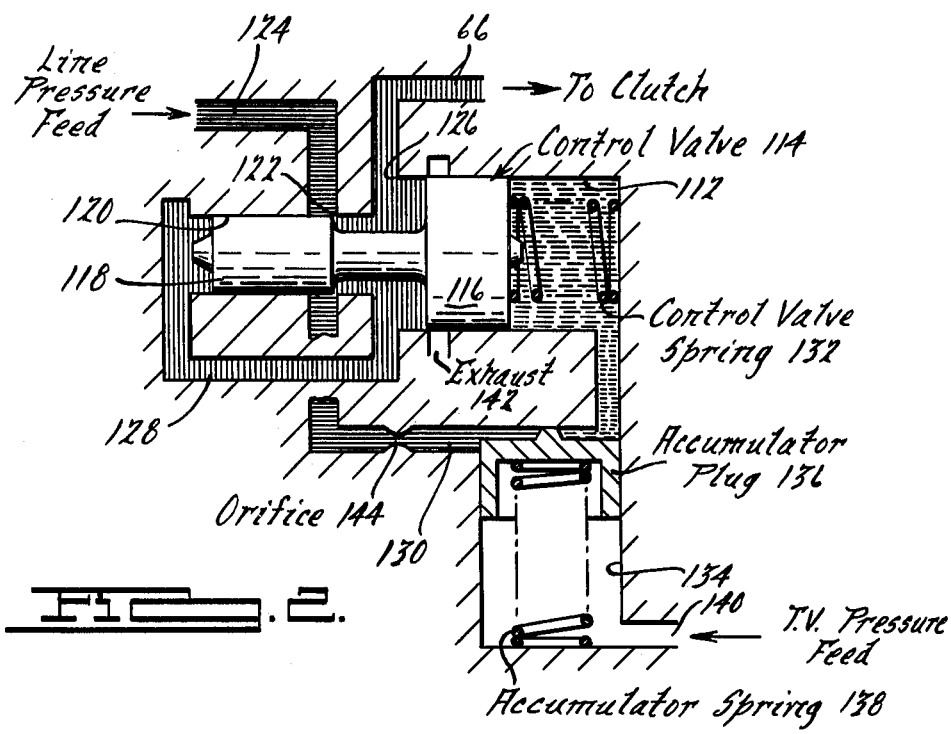
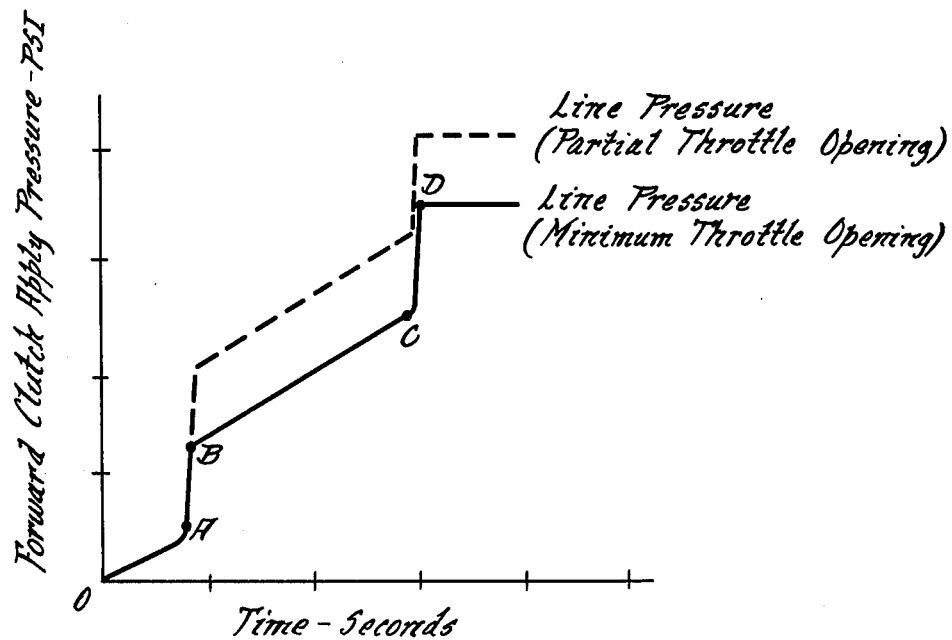

CONTROL VALVE MECHANISM FOR HYDRAULIC CLUTCH IN A POWER TRANSMISSION MECHANISM

GENERAL DESCRIPTION OF THE INVENTION

My invention comprises improvements in a control system of the kind described in U.S. Pat. Nos. 3,393,585 and 3,424,037, which are assigned to the assignee of my present invention. Such transmission mechanisms include planetary gearing, a hydrokinetic torque converter having a bladed turbine connected to an input element of the gearing, an output element of the gearing being connected to vehicle road wheels through a driveline and a differential and axle mechanism. Hydraulic clutches and brakes are used with the gearing to establish multiple ratios through the gearing. An automatic control valve system such as the ones described in U.S. Pat. Nos. 3,424,037 and 3,393,585 can be used to establish selective engagement and release of the clutch-and-brake elements.

My present invention is an improvement in the clutch control system for a control circuit of the kind described in the preceding references. In such references a fluid pressure operated clutch is used to establish a driving connection between the turbine of the converter and a torque input element of the gearing. In the particular embodiment shown in the preceding reference patents, the torque input element of the gearing is a ring gear for one of two simple planetary gear sets. The forward clutch is applied during operation of each of the three forward driving ratios. It is released during reverse drive operation. I contemplate that the improvements of my invention can be used to improve the quality of the ratio shift as the forward clutch engages although I contemplate that it also may be used to control clutch engagement in transmissions that employ different gearing than the gearing described in the aforesaid two reference patents.

The improved shift quality is achieved in my improved control system by providing a flow control valve in the fluid pressure feed passage for the forward clutch and by providing a self-regulating feature in the control valve which is capable of establishing a clutch torque capacity that is proportional in magnitude to the engine torque. The valve controls distribution of pressure to the clutch. It is capable of self-regulation to establish metered flow of actuating pressure to the clutch and to establish a gradual pressure buildup behind the clutch piston, thereby controlling the rate of increase of clutch capacity. The clutch is caused to engage initially at a pressure value such that the clutch capacity will be slightly less than engine torque at any given throttle setting. The valve allows the clutch capacity to increase gradually at a controlled rate until the clutch torque exceeds the value of the instantaneous engine torque. Thereafter the clutch becomes fully engaged, and the pressure behind the clutch piston is allowed to increase to its final maximum value. At that time, of course, no change in inertia occurs and no harshness in clutch engagement is apparent since the clutch is fully operative at the time of application of maximum pressure.

I am aware of valve mechanisms for establishing friction clutch engagements including those described in reference U.S. Pat. Nos. 3,242,037 and 3,393,585. Other arrangements for cushioning application of friction torque establishing devices are disclosed in U.S. Pat. Nos. 3,150,057 and 3,099,172 which also are assigned to the assignee of my present invention. Each of them includes separate accumulators in parallel relationship with respect to a friction torque establishing device. Unlike my present invention, they do not include a self-regulating clutch control valve that meters pressure fluid to the clutch at a predetermined rate for any engine torque level. Furthermore, my present invention does not include an orifice device for feeding the clutch servo; and it is insensitive to changes in fluid viscosity. In this respect it differs from prior art devices where an orificing effect is relied upon to establish cushioned engagement.

BRIEF DESCRIPTION OF THE FIGURES OF THE DRAWINGS

FIG. 1 shows a power transmission mechanism having a pressure operated clutch capable of being controlled by the improved control valve mechanism of my invention.

FIG. 2 is a schematic representation of the control valve system for use with the forward clutch of the transmission of FIG. 1.

FIG. 3 is a chart showing the forward clutch pressure buildup rate for a fluid clutch that is controlled by the control valve system of my invention.

PARTICULAR DESCRIPTION OF THE INVENTION

In FIG. 1 reference numeral 10 designates a hydrokinetic torque converter having an impeller 12, a turbine 14 and a stator 16. Each of these converter members is bladed to establish a toroidal fluid circuit in known fashion. The impeller is driven by an engine for the vehicle as shown at 18. The crankshaft of the engine is connected to impeller shell 20, which forms a part of the impeller 12. A turbine 14 is connected drivably to turbine shaft 22 which is connected to compound clutch member 24. Clutch member 24 defines an annular cylinder 26 in which is positioned an annular piston 28 for forward clutch 30. Clutch member 26 forms also one element of a direct-and-reverse clutch 32. Direct-and-reverse clutch 32 defines an annular cylinder 34 and a brake drum 36 about which is located intermediate brake band 38. Brake band 38 is applied and released by a fluid pressure operated brake servo shown at 40.

Clutch discs 42 carried by the clutch member 26 register with clutch discs 44 carried by clutch member 46. Clutch member 46, in turn, is connected to ring gear 48 of a first simple planetary gear unit 50.

Clutch member 24 carries also clutch discs 52 for the direct-and-reverse clutch 52. Clutch discs 54 are carried by the annular cylinder 34. Clutch piston 56 in cylinder 34 forms a pressure chamber which when pressurized causes the piston 36 to engage the clutch disc 52 and 54, thereby establishing a driving connection between turbine shaft 22 and cylinder 34, the latter in turn being connected to sun gear 58 by torque transfer member 60. Sun gear 58 is common to the simple planetary gear unit 50 and a second simple planetary gear unit 62. Passage 64 delivers pressure to the chamber behind clutch piston 56. Passage 66 delivers clutch actuating pressure to the pressure chamber behind piston 28. When piston 28 is pressurized, turbine shaft 22 becomes connected drivably to ring gear 48 through the clutch member 46.

Brake servo 40, which is referred to in FIG. 1 as the intermediate servo, comprises a cylinder 68 in which is positioned a double acting piston 70. Pressure chambers are located on either side of the piston 70 and each of these chambers is supplied with pressure fluid through a separate passage as shown at 72 and 74, respectively. The force developed on the piston 70 is transmitted to the operating end of the band 38, which is adapted to anchor the torque transfer member 60 and the sun gear 58. Return spring 76 tends normally to urge the piston to a brake release position. When both sides of the piston 70 are pressurized, the piston is stroked to a brake release position. When only the left hand side of the piston 70 is pressurized, the brake band becomes applied.

Gear unit 50 includes, in addition to the ring gears 48 and sun gear 58, a carrier 78 which is connected to driven shaft 80. Pinions 82 are journalled on the carrier 78, and they mesh with ring gear 48 and sun gear 50.

Gear unit 62 includes ring gear 84, carrier 86 and pinions 88, the latter being supported rotatably on carrier 86. The carrier 86 forms a part of brake ring 90 which carries brake discs 92. Cooperating brake discs are carried by the stationary transmission housing 94.

The housing 94 defines an annular cylinder 96 in which is positioned brake cylinder 98, which cooperates with the cylinder 96 to define a pressure cavity that is adapted to be pressurized when fluid pressure is admitted to it through passage 100. Overrunning brake 102 anchors the carrier 86 against rotation in one direction but permits freewheeling motion in the opposite direction. It is adapted to establish a torque reaction point during operation of the transmission in the lowest drive ratio.

A governor valve mechanism 104 is connected to and rotatable with the driven shaft 80. It includes a primary governor valve 106 and a secondary governor valve 108. Each valve is adapted to establish a fluid pressure speed signal over the respective drive ranges. Driven shaft 80 is connected to road wheels 110 through a drive shaft and differential mechanism, not shown.

Ring gear 84 is connected drivably to the output shaft 80 as is the carrier 78.

To establish the lowest forward drive ratio, clutch 30 is applied by pressurizing passage 66. This establishes a driving connection between turbine shaft 22 and the ring gear 48 with the carrier 86 acting as a rection element. The driving torque acting on the carrier 78 is distributed to the output shaft 80, and a portion of the torque is distributed from the ring gear 84 to the output shaft 80. To establish the intermediate ratio, the forward clutch 36 remains applied; but the brake band 38 is applied by pressurizing the passage 72. This anchors the sun gear 58, and the output shaft 80 is driven at an increased speed relative to the speed of turbine shaft 22. To establish direct, forward drive operation, brake band 38 is released and both clutches 44 and 52 are applied simultaneously thereby locking together the elements of the gear system for rotation in unison.

Reverse drive is obtained by engaging multiple disc brake 92. This anchors the carrier 86. The forward clutch 30 is released, and the clutch 54 is applied so that turbine torque is distributed to the sun gear 50 through the torque transfer member 60. This drives ring gear 84 and the output shaft 80 in a reverse direction.

Multiple disc brake 92 can be applied to establish coast braking or manual low operation to complement the action of the overrunning brake 102.

The control valve system for controlling application of the forward clutch is illustrated in detail in FIG. 2. It is situated in the clutch feed passage 66 as indicated. The control valve system comprises a valve chamber 112 within which is slidably positioned a control valve spool 114 having two diameters. The larger diameter land 116 is slidably positioned in valve chamber 112, and the smaller diameter valve land 118 is slidably positioned in valve chamber 120. Passage 66 which extends to the forward clutch communicates with the valve chamber 112, and the pressure in the passage 66 acts on the differential area defined by lands 116 and 118. Land 118 registers with port 122 in the valve chamber 120. Port 122 communicates with passage 124, which extends from a driver controlled manual valve that supplies pressure to the valve system when the manual valve is moved to a forward drive position. This pressure is made available by an engine driven pump, and it is regulated in known fashion by a pressure regulator valve that is sensitive to engine torque and vehicle speed. This function of the manual valve and the regulator valve is described in each of reference patents Nos. 3,424,037 and 3,393,585. The port through which passage 66 communicates with valve chamber 112 is identified in FIG. 2 by reference character 126.

A feedback passage 128 extends from valve chamber 112 to the left hand side of valve chamber 120 so that the pressure from the port 126 is directed to the left hand side of the valve land 118.

A control passage 130 extends from valve chamber 120 to the right hand side of the valve chamber 112. Valve land 118 controls the degree of communication between passage 130 and valve chamber 120.

Valve chamber 112 defines a pressure chamber on the right hand side of the valve land 116. This chamber communicates with the passage 130. Valve spring 132 is located in the chamber on the right hand side of the valve land 116 and urges the valve spool in a left hand direction.

Accumulator chamber 134 communicates with the passage 130. Slidably positioned in the accumulator chamber 134 is accumulator piston 136 which is subjected on its upper surface to the pressure in passage 130. Accumulator spring 138 urges the piston 136 against the opposing force of the pressure in the passage 130. The throttle pressure passage 140 communicates with the accumulator chamber 134 below the piston 136. Throttle pressure passage 140 communicates with the outlet side of a throttle valve system which is actuated by engine manifold pressure to establish a signal that is proportional to engine torque. Such a throttle valve system is described in the previously mentioned reference U.S. Pats. Nos. 3,424,037 and 3,393,585.

In a typical vehicle engine with which the transmission system of my invention can be used the engine torque may vary from about 95 pounds feet to about 250 pounds feet depending upon the engine throttle opening. It is desirable to regulate the clutch torque at which the clutch becomes engaged so that it is approximately equal at any instant to the engine torque delivered by the engine. This function is achieved by the valve system of FIG. 2. In all forward drive positions the forward clutch is engaged. Smooth clutch engagement is achieved by regulating the clutch apply pressure sos that at any given engine torque the clutch engaging pressure will be regulated so that clutch engagement will be initiated at a value slightly lower than engine torque, whereupon it will gradually increase until the clutch torque capacity exceeds the engine torque.

As soon as the manual valve is moved to the forward position after having assumed a park or neutral position, line pressure is fed to passage 124. At that instant the control valve 114 is in a left-hand position, and free communication is established between port 122 and port 126. This relatively unrestricted flow of oil in line pressure passes through the valve rapidly and fills the clutch. After the clutch is filled, the pressure at port 126 develops a force on the differential area of the lands 116 and 118 which, when added to the force of the pressure at port 126 acting on the left-hand side of the land 118, will equal the force of the spring 122. The valve then will begin to regulate the pressure made available to the clutch through passage 66. Exhaust port 142 registers with land 116 during this regulating action as the land 118 registers with the port 122.

In the time versus pressure curve of FIG. 3 this instantaneous transient condition is represented by point A. The spring load for spring 132 is selected so that the pressure that is regulated at port 2 at this instant is slightly greater than the clutch fill pressure.

Orifice 144 located in the passage 130 reduces the rate of flow of pressurized fluid to the chamber on the right-hand side of the land 116. The pressure on the downstream side of the orifice 144 acts on the accumulator piston 136; and when it is greater than the force of the accumulator spring 138, the piston 136 begins to stroke. This transient condition is represented in the chart of FIG. 3 by point B. The motion of the accumulator piston causes a greater demand for oil flowing through the orifice, and this slows down the clutch apply pressure build-up rate. That build-up rate is equal to the spring rate of the accumulator spring 138. When the accumulator bottoms out, the pressure at the port 127 increases abruptly from point C to the maximum line pressure value D. When the accumulator is stroking, the pressure rises from point B to point C in FIG. 3. The pressure at port 126 during the stroking action increases gradually to balance the increasing pressure on the right-hand side of the valve land 116.

After the accumulating action is completed and the piston 136 is stroked, the control valve 114 will be shifted in a left-hand direction thereby connecting ports 122 and 126; and the clutch then will be applied with full line pressure. If the clutch engagement occurs when the engine throttle is advanced, an increased throttle valve pressure signal will be distributed to the lower side of the accumulator piston 136 through the passage 140. This will raise the pressure level during clutch engagement to that shown by means of dotted lines in FIG. 3. The pressure build-up rate, however, is constant regardless of the magnitude of the throttle valve pressure acting on the accumulator piston 136.

The accumulator spring rate determines the rate of pressure build-up and the slope of the line from point B to point C in FIG. 3. The load on the accumulator spring determines the location of the point B along the ordinate of the chart.

Having described a preferred embodiment of my invention what I claim and desire to secure by U.S. Letters Patent is:

1. A clutch capacity control valve system for controlling engagement of a pressure operated clutch comprising a fluid pressure feed passage for said clutch, a pressure regulator valve in said passage for modulating the pressure made available to said clutch, said valve comprising a valve chamber, a regulating valve spool having spaced valve lands, a first port and a second port communicating with said valve chamber at locations intermediate said valve element lands, a bypass passage extending from one portion of said valve chamber to one side of said valve element, spring means acting on said one side of said valve element tending to move the latter to a passage open position which establishes relatively free communication between said ports, one valve land registering with one port of establish restricted fluid communication between said ports, an exhaust port registering with the other valve land whereby said valve element regulates the pressure made available to said clutch when the pressure force acting thereon overcomes the force of said spring, an accumulator comprising an accumulator chamber on said one side of said valve element, an accumulator piston in said accumulator chamber having a pressure area thereon that is subjected to the pressure in said valve chamber on said one side of said valve element and an accumulator valve spring opposing the pressure force acting on said accumulator piston, said accumulator including means for distributing a torque sensitive pressure signal to said accumulator chamber whereby a pressure force proportional to torque is developed on said accumulator piston to supplement the force of said accumulator spring.

2. A clutch capacity control valve system for controlling engagement of a pressure operated clutch comprising a fluid pressure feed passage for said clutch, a pressure regulator valve in said passage for modulating the pressure made available to said clutch, said valve comprising a valve chamber, a regulating valve spool having spaced valve lands, a first port and a second port communicating with said valve chamber at locations intermediate said valve element lands, a bypass passage extending from one portion of said valve chamber to one side of said valve element, spring means acting on said one side of said valve element tending to move the latter to a passage open position which establishes relatively free communication between said ports, one valve land registering with one port to establish restricted fluid communication between said ports, an exhaust port registering with the other valve land whereby said valve element regulates the pressure made available to said clutch when the pressure force action thereon overcomes the force of said springs, an orifice means in said bypass for establishing restricted flow from said clutch feed pressure line to said valve chamber on said one side of said valve element, an accumulator comprising an accumulator chamber in fluid communication with said valve chamber on said one side of said valve element, an accumulator piston in said accumulator chamber having a pressure area thereon that is subjected to the pressure in said valve chamber on said one side of said valve element and an accumulator valve spring opposing the pressure force acting on said accumulator piston, said accumulator including means for distributing a torque sensitive pressure signal to said accumulator chamber whereby a pressure force proportional to torque is developed on said accumulator piston to supplement the force of said accumulator spring.

* * * * *